United States Patent
Suzuki et al.

(10) Patent No.: US 11,608,075 B2
(45) Date of Patent: Mar. 21, 2023

(54) INFORMATION PROCESSING APPARATUS

(71) Applicant: TOYOTA JIDOSHA KABUSHIKI KAISHA, Toyota (JP)

(72) Inventors: Ikuma Suzuki, Okazaki (JP); Wataru Kanda, Nisshin (JP); Kaiji Itabashi, Nagoya (JP); Yoshihisa Yamada, Nagoya (JP); Kazuki Miyake, Okazaki (JP); Tamotsu Kondoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 463 days.

(21) Appl. No.: 16/422,265

(22) Filed: May 24, 2019

(65) Prior Publication Data
US 2020/0070849 A1 Mar. 5, 2020

(30) Foreign Application Priority Data

Aug. 30, 2018 (JP) .............................. JP2018-161528

(51) Int. Cl.
*B60W 50/08* (2020.01)
*B60W 40/107* (2012.01)
(Continued)

(52) U.S. Cl.
CPC ........ *B60W 50/087* (2013.01); *B60W 40/107* (2013.01); *B60W 40/109* (2013.01); *B60W 40/114* (2013.01); *B60W 50/12* (2013.01)

(58) Field of Classification Search
CPC ... B60W 2520/10–14; B60W 2520/20; B60W 2540/18; B60W 2540/10;
(Continued)

(56) References Cited

U.S. PATENT DOCUMENTS

| 7,522,983 B2 * | 4/2009 | Hashimoto ........... B60W 10/04 340/438 |
| 2005/0137766 A1 | 6/2005 | Miyakoshi et al. |

(Continued)

FOREIGN PATENT DOCUMENTS

| CN | 1898117 A | 1/2007 |
| EP | 1369286 A2 | 12/2003 |

(Continued)

OTHER PUBLICATIONS

"How to Measure the Torque (Twisting Power) of Your Car", Nov. 3, 2016, YourMechanic (Year: 2016).*

(Continued)

*Primary Examiner* — Donald J Wallace
(74) *Attorney, Agent, or Firm* — Oliff PLC

(57) ABSTRACT

An information processing apparatus includes a receiver configured to receive a data set including a requested acceleration as information representing movement of a vehicle in a front-rear direction and any one of a steering angle, a yaw rate, and a rotation radius as information representing movement of the vehicle in a lateral direction from each of a plurality of applications, an arbitration unit configured to perform arbitration of information representing the movement of the vehicle in the front-rear direction and arbitration of information representing the movement of the vehicle in the lateral direction based on a plurality of the data sets received by the receiver, and a first output unit configured to output instruction information for driving an actuator based on an arbitration result of the arbitration unit.

19 Claims, 8 Drawing Sheets

(51) Int. Cl.
*B60W 40/109* (2012.01)
*B60W 40/114* (2012.01)
*B60W 50/12* (2012.01)

(58) Field of Classification Search
CPC .. B60W 50/087; B60W 50/12; B60W 40/114; B60W 40/107; B60W 2050/0027; G05D 1/0066
See application file for complete search history.

(56) References Cited

U.S. PATENT DOCUMENTS

| | | |
|---|---|---|
| 2005/0143893 A1 | 6/2005 | Takamatsu et al. |
| 2008/0140283 A1 | 6/2008 | Kuwahara et al. |
| 2009/0062068 A1 | 3/2009 | Nakai et al. |
| 2010/0121549 A1 | 5/2010 | Fukuda et al. |
| 2011/0066344 A1 | 3/2011 | Niwa et al. |
| 2011/0098886 A1 | 4/2011 | Deng |
| 2011/0193693 A1 | 8/2011 | Filev et al. |
| 2012/0022764 A1* | 1/2012 | Tang ................ B60W 50/0097 701/102 |
| 2013/0060433 A1 | 3/2013 | Maruyama et al. |
| 2013/0304344 A1 | 11/2013 | Abe |
| 2014/0285331 A1 | 9/2014 | Otake |
| 2015/0274162 A1* | 10/2015 | Sato ..................... B60W 30/08 701/1 |
| 2017/0217436 A1 | 8/2017 | Inomata |
| 2018/0018895 A1* | 1/2018 | Chan ..................... G05D 1/021 |
| 2019/0023240 A1* | 1/2019 | Asano ................... B60W 10/04 |

FOREIGN PATENT DOCUMENTS

| | | |
|---|---|---|
| JP | 2000-233664 A | 8/2000 |
| JP | 2005-186788 A | 7/2005 |
| JP | 2007-120352 A | 5/2007 |
| JP | 2008-024027 A | 2/2008 |
| JP | 2009-051402 A | 3/2009 |
| JP | 2010-095189 A | 4/2010 |
| JP | 2010-111350 A | 5/2010 |
| JP | 2010285139 A * | 12/2010 |
| JP | 2011-014033 A | 1/2011 |
| JP | 2011-063098 A | 3/2011 |
| JP | 2011-131839 A | 7/2011 |
| JP | 2011-240801 A | 12/2011 |
| JP | 4940803 B2 | 5/2012 |
| JP | 5324367 B2 | 10/2013 |
| JP | 2016-203888 A | 12/2016 |
| JP | 2017-138740 A | 8/2017 |
| WO | 2005/063524 A1 | 7/2005 |
| WO | 2012/098680 A1 | 7/2012 |

OTHER PUBLICATIONS

Autosar; "Explanation of Application Interfaces of the Chassis Domain;" Autosar CP Release 4.3.1.; Dec. 8, 2017; 46 pp.

* cited by examiner

FIG. 3

FORMAT OF DATA SET OF REQUEST INFORMATION
(EXECUTION UNIT (APPLICATION) → REQUEST ARBITRATION UNIT)

| Group | Field |
|---|---|
| LONGITUDINAL IF PACKAGE (LOWER LIMIT SIDE) | REQUESTED LONGITUDINAL ID (LOWER LIMIT) |
| | REQUESTED ACCELERATION (LOWER LIMIT) |
| | BRAKE PERMISSION FLAG (LOWER LIMIT) |
| | GEAR SHIFT PRIORITY REQUEST (LOWER LIMIT) |
| | RESPONSIVENESS REQUEST (LOWER LIMIT) |
| | ACCELERATOR OVERRIDE PROHIBITION FLAG |
| LONGITUDINAL IF PACKAGE (UPPER LIMIT SIDE) | REQUESTED LONGITUDINAL ID (UPPER LIMIT) |
| | REQUESTED ACCELERATION (UPPER LIMIT) |
| | BRAKE PERMISSION FLAG (UPPER LIMIT) |
| | GEAR SHIFT PRIORITY REQUEST (UPPER LIMIT) |
| | RESPONSIVENESS REQUEST (UPPER LIMIT) |
| LATERAL IF PACKAGE | REQUESTED LATERAL ID |
| | REQUESTED STEERING ANGLE/YAW RATE/ROTATION RADIUS |
| | STEERING ANGLE/YAW RATE/ROTATION RADIUS SWITCHING FLAG |
| | DRIVER STEERING FLAG |
| | RESPONSIVENESS REQUEST |
| OTHERS | REQUESTED SHIFT RANGE |
| | SHIFT OVERRIDE PROHIBITION FLAG |

FIG. 4

**FORMAT OF DATA SET OF RESULT INFORMATION
(REQUEST ARBITRATION UNIT → EXECUTION UNIT (APPLICATION))**

INFORMATION REPRESENTING RESULT AFTER ARBITRATION:
- ARBITRATION RESULT_LATERAL ID
- SELECTED REQUESTED STEERING ANGLE/YAW RATE/ROTATION RADIUS
- STEERING ANGLE/YAW RATE/ROTATION RADIUS SWITCHING FLAG
- ARBITRATION RESULT_LONGITUDINAL ID
- SELECTED ACCELERATION

INFORMATION REPRESENTING CURRENT MOVEMENT CONTROL STATE OF VEHICLE:
- ESTIMATED VEHICLE BODY ACCELERATION
- ESTIMATED VEHICLE BODY ACCELERATION INVALIDATION FLAG
- CURRENT SHIFT RANGE
- BRAKE CONTROL EXECUTION FLAG
- STOP HOLDING STATE

INFORMATION REPRESENTING MOVEMENT CONTROL OF VEHICLE CURRENTLY IMPLEMENTABLE:
- VEHICLE SPEED LIMIT FLAG
- VEHICLE SPEED LIMIT
- BRAKING SYSTEM ASSISTANCE LEVEL
- DRIVE SYSTEM ASSISTANCE LEVEL
- LATERAL CONTROL SYSTEM ASSISTANCE LEVEL
- FULL-CLOSED ESTIMATED GROUND ACCELERATION
- FULL-OPEN ESTIMATED GROUND ACCELERATION

INFORMATION REPRESENTING OPERATION STATE OF ACCELERATOR PEDAL AND BRAKE PEDAL BY DRIVER:
- ACCELERATOR PEDAL-RELATED DRIVER REQUESTED ACCELERATION
- BRAKE PEDAL-RELATED DRIVER REQUESTED ACCELERATION

FIG. 5

FORMAT OF DATA SET OF INSTRUCTION INFORMATION (FOR POWERTRAIN CONTROLLER)

| |
|---|
| TARGET DRIVE POWER (UPPER LIMIT) |
| TARGET LONGITUDINAL ID (UPPER LIMIT) |
| TARGET ACCELERATION (UPPER LIMIT) |
| TARGET DRIVE POWER (LOWER LIMIT) |
| TARGET LONGITUDINAL ID (LOWER LIMIT) |
| TARGET ACCELERATION (LOWER LIMIT) |
| ACCELERATOR OVERRIDE PROHIBITION FLAG |
| GEAR SHIFT PRIORITY FLAG (UPPER LIMIT) |
| GEAR SHIFT PRIORITY FLAG (LOWER LIMIT) |

FIG. 6

FORMAT OF DATA SET OF INSTRUCTION INFORMATION (FOR STEERING CONTROLLER)

| |
|---|
| TARGET LATERAL ID |
| TARGET STEERING ANGLE/TARGET YAW RATE/ TARGET ROTATION RADIUS |
| STEERING ANGLE/YAW RATE/ ROTATION RADIUS SWITCHING FLAG |
| DRIVER STEERING FLAG |
| RESPONSIVENESS REQUEST |

FIG. 7

FORMAT OF DATA SET OF INSTRUCTION INFORMATION (FOR BRAKE CONTROLLER)

| |
|---|
| TARGET BRAKING FORCE (UPPER LIMIT) |
| TARGET LONGITUDINAL ID (UPPER LIMIT) |
| TARGET ACCELERATION (UPPER LIMIT) |
| TARGET BRAKING FORCE (LOWER LIMIT) |
| TARGET LONGITUDINAL ID (LOWER LIMIT) |
| TARGET ACCELERATION (LOWER LIMIT) |
| GEAR SHIFT PRIORITY FLAG (UPPER LIMIT) |
| GEAR SHIFT PRIORITY FLAG (LOWER LIMIT) |

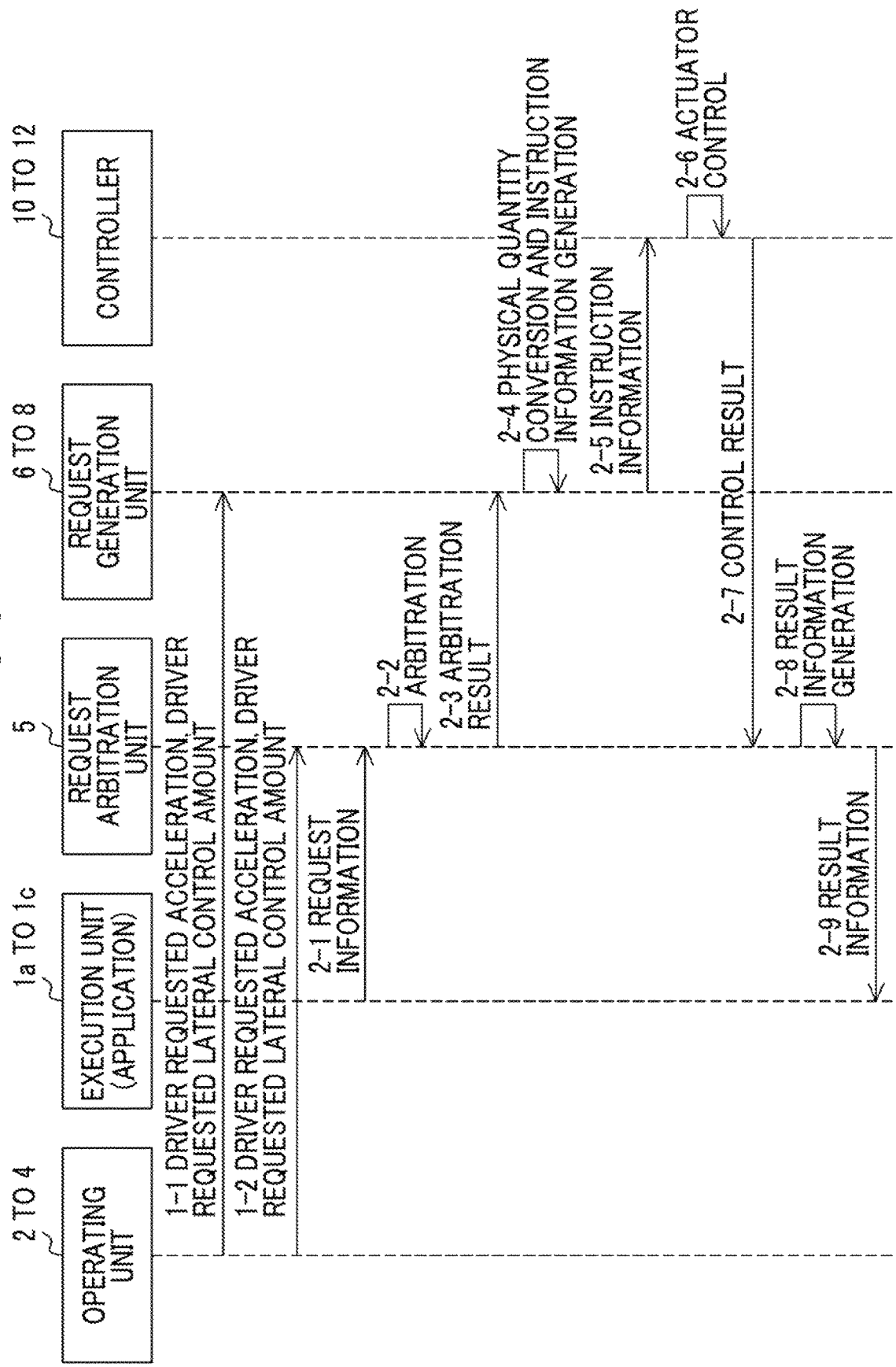

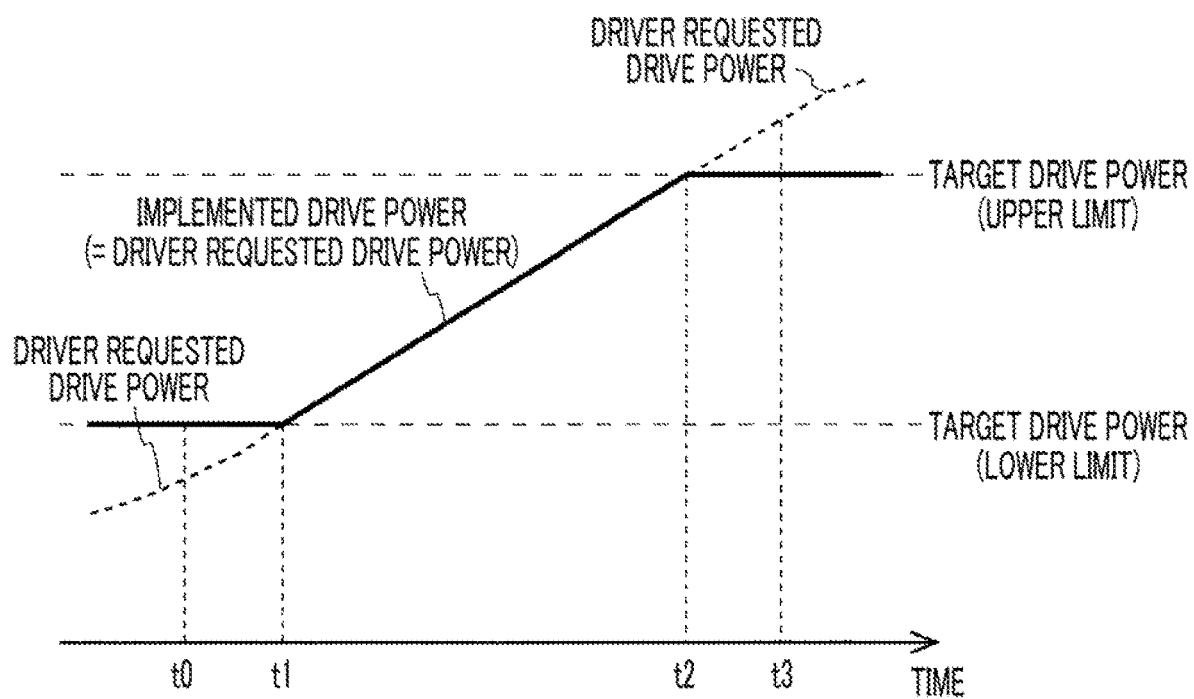

INFORMATION PROCESSING APPARATUS

INCORPORATION BY REFERENCE

The disclosure of Japanese Patent Application No. 2018-161528 filed on Aug. 30, 2018 including the specification, drawings and abstract is incorporated herein by reference in its entirety.

BACKGROUND

1. Technical Field

The present disclosure relates to an information processing apparatus that controls movement of a vehicle.

2. Description of Related Art

Japanese Unexamined Patent Application Publication No. 2007-120352 (JP 2007-120352 A) describes a control device for a vehicle including arbitration means for arbitrating a drive request to an engine based on a driver operation and a drive request from a driving assistance system to the engine. The arbitration means described in JP 2007-120352 A performs arbitration after converting a target value of the drive request based on the driver operation and a target value of the drive request based on an operation other than the driver operation to the same physical quantity. The arbitration means holds a target value before converting the physical quantity. As a result of the arbitration, in a case where there is a need to inversely convert a selected target value to an original physical quantity, the arbitration means calculates a target control amount of the engine using the held target value, thereby avoiding errors due to the conversion and inverse conversion of the physical quantity or reduction in the number of significant digits.

SUMMARY

In recent years, a driving assistance system (driving assistance application) that is mounted in a vehicle, such as autonomous driving or automatic parking, is increasing. When the types of driving assistance systems increase, a drive request to one actuator also increases. For this reason, in the method described in JP 2007-120352 A, arbitration processing becomes complicated.

The disclosure provides an information processing apparatus capable of easily executing arbitration processing of drive requests output from driving assistance applications.

An aspect of the disclosure relates to an information processing apparatus that arbitrates requests from a plurality of applications implementing driving assistance functions to an actuator. The information processing apparatus includes a receiver, an arbitration unit, and a first output unit. The receiver is configured to receive a data set including a requested acceleration as information representing movement of a vehicle in a front-rear direction and any one of a sleeting angle, a yaw rate, and a rotation radius as information representing movement of the vehicle in a lateral direction from each of the applications. The arbitration unit is configured to perform arbitration of the information representing the movement of the vehicle in the front-rear direction and arbitration of the information representing the movement of the vehicle in the lateral direction based on a plurality of the data sets received by the receiver. The first output unit is configured to output instruction information for driving the actuator based on an arbitration result of the arbitration unit.

In the information processing apparatus according to the aspect, the data set received by the receiver may include information designating whether the information representing the movement of the vehicle in the lateral direction is the steering angle, the yaw rate, or the rotation radius.

In the information processing apparatus according to the aspect, the requested acceleration may include an upper limit requested acceleration and a lower limit requested acceleration. The arbitration unit may be configured to execute arbitration of the upper limit requested acceleration and arbitration of the lower limit requested acceleration in the arbitration of the information representing the movement of the vehicle in the front-rear direction.

The information processing apparatus according to the aspect may further include a second output unit configured to output result information including the arbitration result of the arbitration unit to the applications.

In the information processing apparatus according to the aspect, the second output unit may be configured to output the result information further including at least one of information representing a current state of movement control of the vehicle and information representing a range of movement control currently implementable by the vehicle to the applications.

In the information processing apparatus according to the aspect, the first output unit may be configured to convert the requested acceleration selected by the arbitration unit to power and output the instruction information including the converted power to a controller of the actuator.

According to the aspect of the disclosure, it is possible to provide an information processing apparatus capable of easily executing arbitration processing of drive requests output from driving assistance systems.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing a format of a data set of request information that is output from an execution unit to a request arbitration unit;

FIG. 4 is a diagram showing a format of a data set of result information that is output from the request arbitration unit to the execution unit;

FIG. 5 is a diagram showing a format of a data set of instruction information that is output front a request generation unit to a powertrain controller;

FIG. 6 is a diagram showing a format of a data set of instruction information that is output from the request generation unit to a steering controller;

FIG. 7 is a diagram showing a format of data set of instruction information that is output from the request generation unit to a brake controller;

FIG. 8 is a sequence illustrating control processing in the vehicle control system according to the embodiment; and FIG. 9 is a graph illustrating an example of movement control in a longitudinal direction of a vehicle.

DETAILED DESCRIPTION OF EMBODIMENTS

Outline

An information processing apparatus according to an embodiment of the disclosure arbitrates requests output from a plurality of driving assistance applications (also known as "Advanced Driver Assistance Systems (ADAS) applications") to actuators. The information processing apparatus receives one or both of a movement control amount in a front-rear direction (requested acceleration) and a movement control amount in a lateral direction (at least one of a steering angle, a yaw rate, and a rotation radius) from the driving assistance applications and performs arbitration based on the received movement control amount. The reception and the arbitration of the requests from the driving assistance applications are performed based on information determined in advance, whereby it is possible to easily execute arbitration processing and to easily cope with an increase in the number of driving assistance applications.

Embodiment

Overall Configuration of Vehicle Control System

Figure 1:
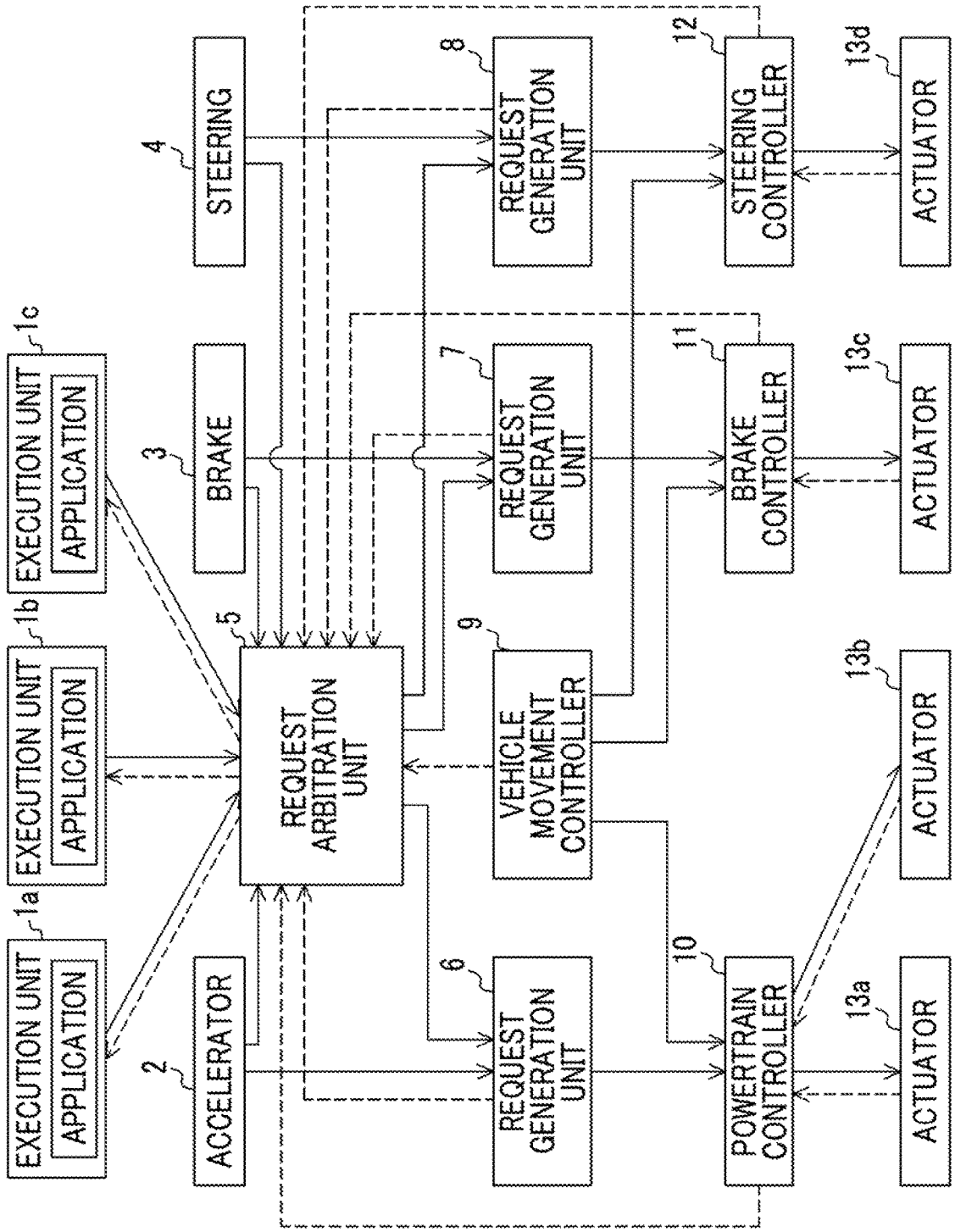
FIG. 1 is a functional block diagram of a vehicle control system according to an embodiment.

FIG. 1 is a functional block diagram of a vehicle control system according to an embodiment.

The vehicle control system shown in FIG. 1 includes a plurality of execution units 1a to 1c, an accelerator 2, a brake 3, a steering 4, a request arbitration unit 5, request generation units 6 to 8, a vehicle movement controller 9, a powertrain controller 10, a brake controller 11, a steering controller 12, and actuators 13a to 13d.

The execution units a to 1c are devices that execute the driving assistance applications (hereinafter, simply referred to as "applications") to implement driving assistance functions of a vehicle, such as autonomous driving, automatic parking, adaptive cruise control, lane keeping assistance, and collision reduction braking. The execution units 1a to 1c are implemented by computers, such as electronic control units (ECUs) each having a processor, such as a central processing unit (CPU), and a memory. The execution units 1a to 1c constitute a pan of a driving assistance system along with the applications for implementing the driving assistance functions. The execution units 1a to 1c implement different driving assistance functions and can be operated simultaneously. In FIG. 1, for simplification of description, although the three execution units 1a to 1c are shown, the number of execution units that implement the driving assistance functions is not limited, and two or less or four or more execution units may be mounted in the vehicle. The execution units 1a to 1c output request information for requesting to drive the actuators 13a to 13d to a request arbitration unit 5 described below.

The accelerator 2, the brake 3, and the steering 4 are input devices that are operated by a driver to control movement of the vehicle. An operation amount of the accelerator 2 (accelerator pedal) by the driver is detected by an accelerator pedal sensor (not shown) and is output as information for specifying an acceleration (hereinafter, referred to as a "driver requested acceleration") requested by the driver to the request generation unit 6. An operation amount of the brake 3 (brake pedal) by the driver is detected by a brake pedal sensor (not shown) and is output as information for specifying the driver requested acceleration to the request generation unit 7. The driver requested acceleration input by the operation of the brake 3 is a negative acceleration that makes the vehicle generate braking force (note that an acceleration in a moving direction of the vehicle is a positive acceleration). An operation amount of the steering 4 (steering wheel) by the driver is detected by a steering sensor (not shown) and is output as information for specifying a steering amount (hereinafter, referred to as a "driver requested lateral control amount") in a lateral direction of the vehicle to be requested by the driver to the request generation unit 8. The driver requested acceleration input by the operation of the accelerator 2 or the brake 3 and the driver requested lateral control amount input by the operation of the steering 4 can also be output to the request arbitration unit 5 described below and can be notified to the applications through the request arbitration unit 5.

The request arbitration unit 5 receives the request information transmitted from the applications of the execution units 1a to 1c and arbitrates the received request information. The request information received by the request arbitration unit 5 from the applications includes information for controlling movement in the front-rear direction of the vehicle and information for controlling movement in the lateral direction of the vehicle. In the specification, the front-rear direction of the vehicle may be referred to as a "longitudinal direction". Information for controlling the movement in the front-rear direction of the vehicle includes at least an acceleration (hereinafter, referred to as a "requested acceleration") to be requested by the application. Information for controlling the movement in the lateral direction of the vehicle includes at least one (hereinafter, referred to as a "lateral control amount") of a steering angle, a yaw rate, and a rotation radius. Details of the request information received by the request arbitration unit 5 from the applications will be described below.

For example, as arbitration processing, the request arbitration unit 5 selects one piece of request information from among a plurality of pieces of received request information based on a predetermined selection criterion or sets an allowable range of control based on a plurality of pieces of received request information. The request arbitration unit 5 generates result information including an arbitration result and transmits the generated result information to the execution units 1a to 1c. The request arbitration unit 5 can generate information representing a current state of movement control of the vehicle, information representing the movement control of the vehicle currently implementable by the vehicle, information representing an operation amount of the driver, or the like based on output values of various sensors mounted in the vehicle or information representing operation states or availability of the actuators 13a to 13d to be notified from the powertrain controller 10, the brake controller 11, and the steering controller 12 described below and can transmit various kinds of generated information to the execution units 1a to 1c. Details of the configuration of the request arbitration unit 5 and the arbitration processing will be described.

The request arbitration unit 5 can distribute a control amount of the vehicle included in the request information selected through arbitration and instructed by the applications to the powertrain controller 10, the brake controller 11, and the steering controller 12. For example, tire braking force of the vehicle can be generated by both of a powertrain and a brake device. The request arbitration unit 5 can distribute the braking force requested by the applications to the powertrain and the brake device according to responsiveness to be requested, availability of the actuators 13a to 13c, or the like. The movement of the vehicle in the lateral direction can also be implemented by individually controlling the brake device of each wheel in addition to a steering device. The request arbitration unit 5 can also distribute a lateral control amount to be requested by the applications to the brake device and the steering device according to responsiveness to be requested, availability of the actuators 13c, 13d, or the like.

The request generation unit 6 generates instruction information for generating drive power in the actuators 13a, 13b constituting the powertrain based on the driver requested acceleration output from the accelerator 2 and the request information arbitrated by the request arbitration unit 5. The request generation unit 6 outputs the generated instruction information to the powertrain controller 10. Requests may be input to the request generation unit 6 from both of the accelerator 2 and the request arbitration unit 5. For example, a case where the driver operates the accelerator 2 during control through adaptive cruise control is considered. The request generation unit 6 outputs the request from each of the accelerator 2 and the request arbitration unit 5 to the powertrain controller 10.

The request generation unit 7 generates instruction information for generating the braking force in the actuator 13c constituting the brake device based on the driver requested acceleration output from the brake 3 and the request information arbitrated by the request arbitration unit 5. The request generation unit 7 outputs the generated instruction information to the brake controller 11. Requests may be input to the request generation unit 7 from both of the brake 3 and the request arbitration unit 5. For example, a case where the driver intentionally operates the brake 3 for risk avoidance or the like during autonomous driving or during automatic parking is considered. In a case where a request from the driver and a request from the request arbitration unit 5 are input simultaneously, the request generation unit 7 selects any one request based on a selection criterion prepared in advance. The selection criterion for selecting one of the request from the driver and the request from the request arbitration unit 5 can be appropriately set based on the magnitude or sign of a control amount to be requested from the driver, priority set in each of the applications, or the like. The request generation unit 7 outputs the request from each of the brake 3 and the request arbitration unit 5 to the brake controller 11.

The request generation unit 8 generates instruction information for generating the movement of the vehicle in the lateral direction in the actuator 13d constituting the steering device based on the driver requested lateral control amount to be output from the steering 4 and the request information arbitrated by the request arbitration unit 5. The request generation unit 8 outputs the generated instruction information to the steering controller 12. Drive requests may be input to the request generation unit 8 from both of the steering 4 and the request arbitration unit 5. For example, a case where the driver intentionally operates the steering 4 to make the vehicle move laterally or turn for risk avoidance or the like during control through lane keeping assistance is considered. In a case where a drive request from the driver and a drive request from the request arbitration unit 5 are input simultaneously, the request generation unit 8 selects any one drive request based on a selection criterion prepared in advance. The selection criterion for selecting one of the request from the driver and the request from the request arbitration unit 5 can be appropriately set based on the magnitude or sign of a control amount to be requested from the driver, priority set in each of the applications, or the like, in a case where any one of the drive request from the driver and the drive request from the request arbitration unit 5 is selected, the request generation unit 8 notifies the request arbitration unit 5 of a selection result.

The vehicle movement controller 9 controls the actuators 13a to 13d by directly instructing the powertrain controller 10, the brake controller 11, and the steering controller 12 without passing through the request arbitration unit 5, thereby controlling the traveling stability of the vehicle integrally and autonomously. As the control to be executed by the vehicle movement controller 9, control for suppressing run idling of a tire or a sideslip of the vehicle by adjusting the output of the powertrain or the braking force of the vehicle, control for restraining tire lock at the time of sudden braking, control for detecting emergency braking from a brake depression amount and a depression speed and generating large braking force, and the like can be exemplified. Since vehicle stabilization control to be executed by the vehicle movement controller 9 needs to be executed instantly when the traveling stability of the vehicle is damaged, the vehicle stabilization control is executed independently from and with priority over the request from the driver and the requests from the execution units 1a to 1c. The vehicle movement controller 9 notifies the request arbitration unit 5 that the vehicle stabilization control is in execution when the vehicle stabilization control is in execution. The vehicle movement controller 9 notifies the request arbitration unit 5 of information relating to movement control (availability) of the vehicle currently implementable by the actuators 13a to 13d when the vehicle stabilization control is in execution. Information relating to the availability is notified from the request arbitration unit 5 to the execution units 1a to 1c. When the vehicle stabilization control is in execution in the vehicle movement controller 9, the actuators 13a to 13d may not implement the requests from the execution units 1a to 1c. The vehicle movement controller 9 notifies the execution units 1a to 1c of information relating to the availability through the request arbitration unit 5, whereby it is possible to allow the driving assistance applications to correct processing in execution.

The powertrain controller 10 controls the operations of the actuators 13a, 13b constituting the powertrain (may also be referred to as a drive train), thereby generating drive power requested from the request generation unit 6 or the vehicle movement controller 9. The powertrain controller 10 is implemented by, for example, any one of an engine control ECU, a hybrid control ECU, a transmission ECU, and the like or a combination thereof according to the configuration of the powertrain. In FIG. 1, for simplification of description, although the two actuators 13a, 13b are shown as a control target of the powertrain controller 10, the number of actuators to be controlled by the powertrain controller 10 may be one or three or more according to the configuration of the powertrain of the vehicle. As examples of the actuators 13a, 13b constituting the powertrain, an engine, a drive motor, a clutch, a transmission, a torque converter, and the like are exemplified. The powertrain controller 10 acquires information relating to operation states of the actuators 13a, 13b based on signals output from the actuators 13a, 13b or measurement values of sensors. As an example of information relating to the operation slate of the actuator, information representing the availability of the actuator (information representing whether or not the actuator tails or information representing tire degree of failure of the actuator), information representing a monitor value of drive power to be implemented by the actuator, and the like are exemplified. The powertrain controller 10 notifies the request arbitration unit 5 of the acquired information relating to the operation states of the actuators 13a, 13b.

The brake controller 11 controls the actuator 13c operating the brake device provided in each wheel, thereby generating braking force requested from the request generation unit 7 or the vehicle movement controller 9. An output value of a wheel speed sensor provided in each wheel is input to the brake controller 11 through a direct line. The brake controller 11 acquires information relating to the operation state of the actuator 13c based on a signal output from the actuator 13c or a measurement value of a sensor. As information relating to the operation slate of the actuator 13c, in addition to the above-described information representing the availability or information representing a monitor value of braking force to be implemented by the actuator 13c, information unique to the actuator 13c, such as information regarding whether or not a temperature of a brake pad transits in an overheat direction, can be exemplified. The brake controller 11 notifies the request arbitration unit 5 of the acquired information relating to the operation state of the actuator 13c.

The steering controller 12 controls the actuator 13d provided in an electric power steering (EPS), thereby controlling a steering angle, that is, the direction of the tire connected through a rack and pinion mechanism. The steering controller 12 is implemented by, for example, a power steering control ECU. The steering controller 12 acquires information relating to the operation state of the actuator 13d based on a signal output from the actuator 13d or a measurement value of a sensor. As an example of information relating to the operation state of the actuator 13d, the above-described information representing the availability, information representing a monitor value of a pinion angle (steering angle), a yaw rate, or a rotation radius to be implemented by the actuator 13d, and the like are exemplified. The steering controller 12 notifies the request arbitration unit 5 of the acquired information relating to the operation state of the actuator 13d.

A drive request from any one of the request generation units 6 to 8 and a drive request from the vehicle movement controller 9 may be input simultaneously to the powertrain controller 10, the brake controller 11, and the steering controller 12. For example, in a case where the powertrain controller 10 generates driver requested drive power, when a sideslip of the wheel is detected, the vehicle movement controller 9 controls braking force to be generated in the brake device of each wheel and an output of the engine or the drive motor in order to suppress a sideslip of the vehicle. In this case, in order to implement sideslip suppression by the vehicle movement controller 9, the powertrain controller 10, the brake controller 11, and the steering controller 12 give priority to an instruction from the vehicle movement controller 9 to control the actuators 13a to 13d.

Configuration of Information Processing Apparatus

Figure 2:
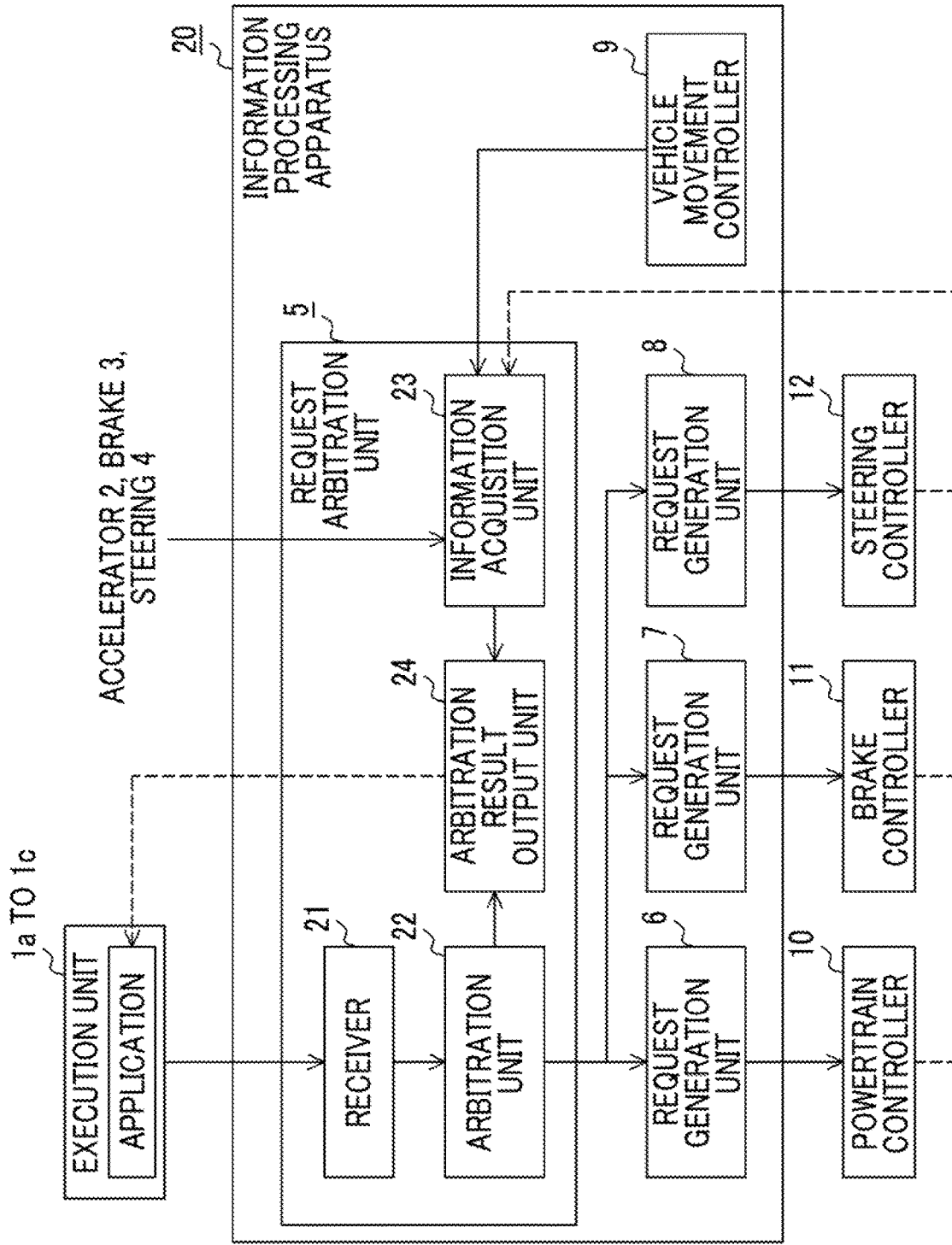
FIG. 2 is a detailed functional block diagram of an information processing apparatus according to the embodiment.

FIG. 2 is a detailed functional block diagram of an information processing apparatus 20 (also known as a "manager") according to the embodiment. The configuration of the information processing apparatus 20 will be described referring to FIGS. 1 and 2 together.

The information processing apparatus 20 according to the embodiment includes the request arbitration unit 5, the request generation units 6 to 8, and the vehicle movement controller 9 described above. The information processing apparatus 20 has a function as a vehicle movement manager that manages the movement of the vehicle. In the embodiment, the information processing apparatus 20 is provided in the same ECU (brake ECU) as the brake controller 11, and can transmit and receive signals to and from the brake controller 11 through a wiring in the ECU. The information processing apparatus 20 is connected to perform communication with the execution units 1a to 1c, the powertrain controller 10, and the steering controller 12 through an in-vehicle network, such as a controller area network (CAN). As in the embodiment, in a case where the information processing apparatus 20 and the brake controller 11 are provided in the same ECU, a transmission signal from the information processing apparatus 20 to the brake controller 11 does not flow on the in-vehicle network. However, the information processing apparatus 20 and the brake controller 11 do not need to be provided in the same ECU, and the information processing apparatus 20 and the brake controller 11 may be provided in different ECUs and may be connected to perform communication through the in-vehicle network. As in the embodiment, an advantage of providing the information processing apparatus 20 and the brake controller 11 in the same ECU will be described below.

As shown in FIG. 2, the request arbitration unit 5 includes a receiver 21, an arbitration unit 22, an information acquisition unit 23, and an arbitration result output unit 24.

The receiver 21 receives the request information to the actuators 13a to 13d from the application to be executed in each of the execution units 1a to 1c. The request information is transmitted as a data set of a predetermined format to the in-vehicle network, for example, at every given time. In the data set of the predetermined format, information representing the movement (the movement in the longitudinal direction and/or the movement in the lateral direction) of the vehicle to be requested by the application is included. The receiver 21 receives data frames transmitted from the execution units 1a to 1c and acquires data sets including the request information. The data set transmitted from each of the execution units 1a to 1c to the receiver 21 may include both or any one of information representing the movement of the vehicle in the front-rear direction and information representing the movement of the vehicle in the lateral direction. Details of the data sets received by the receiver 21 from the execution units 1a to 1c will be described below.

The arbitration unit 22 arbitrates the request information based on a plurality of data sets received by the receiver 21. The arbitration unit 22 performs arbitration on each of information representing the movement of the vehicle in the front-rear direction included in the received data sets and information representing the movement of the vehicle in the lateral direction included in the received data sets. As described above, in the data sets received by the receiver 21, an acceleration is included as information representing the movement of the vehicle in the front-rear direction. The arbitration unit 22 performs arbitration of the request information relating to the movement of the vehicle in the front-rear direction by comparing the magnitudes of the accelerations included in the received data sets. Furthermore, in the data sets received by the receiver 21, any one (lateral control amount) of a steering angle, a yaw rate, and a rotation radius is included as information representing the movement of the vehicle in the lateral direction. The arbitration unit 22 performs arbitration of the request information relating to the movement of the vehicle in the lateral direction by comparing the magnitudes of the lateral control amounts included in the received data sets. Details of the arbitration processing of the arbitration unit 22 will be described below.

The information acquisition unit 23 acquires various kinds of information relating to a current movement control state of the vehicle, an operation state of the vehicle by the driver, and the like. For example, the information acquisition unit 23 can acquire the presence or absence of an operation, an acceleration to be requested by the driver, a steering amount to be requested by the driver, and the like from the accelerator 2, the brake 3, and the steering 4. The information acquisition unit 23 can acquire information regarding whether or not the vehicle stabilization control is in execution, the availability of the actuators 13a to 13d when the vehicle stabilization control is in execution, and the like from the vehicle movement controller 9. The information acquisition unit 23 can acquire information relating to the operation states of the actuators 13a, 13b constituting the powertrain, the requested acceleration employed in the powertrain controller 10, and the like from the powertrain controller 10. The information acquisition unit 23 can acquire information relating to the operation state of the actuator 13c constituting the brake device and information relating to the operation state of the actuator 13d constituting the steering device from the brake controller 11 and the steering controller 12. The information acquisition unit 23 can acquire an acceleration, a vehicle speed, a wheel speed, or the like based on output data of various sensors mounted in the vehicle.

The arbitration result output unit 24 transmits the result information reflecting an arbitration result of the arbitration unit 22 to the execution units 1a to 1c. The result information includes the acceleration selected in the powertrain controller 10 and the lateral control amount (any one of the steering angle, the yaw rate, and the rotation radius) of the vehicle selected by the arbitration unit 22 through the arbitration processing. Although details of a data set of the result information generated by and output from the arbitration result output unit 24 will be described below, the data set of the result information may include, as information useful for the application to execute control, a current movement control state of the vehicle, movement control (availability) of the vehicle currently implementable, an operation stale by the driver, communication states of the execution units 1a to 1c and the request arbitration unit 5, and the like, in addition to the selected acceleration and the selected lateral control amount. In a case where the data set of the result information includes information regarding the current movement control state of the vehicle, the movement control of the vehicle currently implementable, the operation state by the driver, the communication stales, and the like, the applications to be executed in the execution units 1a to 1c can acquire the state of the vehicle, the driver request, or the like from the result information.

The request generation units 6 to 8 generate the instruction information for driving each of the actuators 13a to 13d based on the requested acceleration and the lateral control amount selected by the arbitration unit 22 and transmit the generated instruction information to the powertrain controller 10, the brake controller 11, and the steering controller 12. The request generation units 6, 7 have a function of convening the requested acceleration and the driver requested acceleration selected by the arbitration unit 22 to power as physical quantities of the outputs of the powertrain and the brake device. The request generation units 6, 7 generate data sets of the instruction information including power after conversion. Details of the data set of the instruction information generated by and output from each of the request generation units 6 to 8 will be described below.

In the configuration of the information processing apparatus 20 according to the embodiment, the request generation units 6 to 8 correspond to a first output unit that outputs the instruction information to the actuators 13a to 13d based on the arbitration result of tire arbitration unit 22, and the arbitration result output unit 24 corresponds to a second output unit that outputs the result information including the arbitration result of the arbitration unit 22 to the execution units 1a to 1c.

In the information processing apparatus 20 according to the embodiment, various kinds of information acquired by the information acquisition unit 23 are fed back to the applications to be executed in the execution units 1a to 1c by the arbitration result output unit 24. The applications can monitor execution situations of control processing for providing driving assistance functions based on the result information acquired from the arbitration result output unit 24, and can change or stop the control processing as needed. The information acquisition unit 23 provided in the request arbitration unit 5 puts together various kinds of information, and the arbitration result output unit 24 feeds back needed information to the execution units 1a to 1c, whereby it is possible to suppress an increase in amount of communication between the information processing apparatus 20 and the execution units 1a to 1c.

Here, an advantage of providing the information processing apparatus 20 and the brake controller 11 in the same ECU will be described.

Since the information processing apparatus 20 according to the embodiment receives the request information of the same format from the execution units 1a to 1c, even in a case where an execution unit that executes a new driving assistance application is added, there is an advantage that the control processing of the powertrain controller 10, the brake controller M, and the steering controller 12 does not need to be changed. Although the information processing apparatus 20 is provided as an independent ECU, the information processing apparatus 20 is mounted in an existing ECU, whereby there is an advantage that it is possible to suppress costs. A brake ECU that controls the brake is mounted in all types of vehicles. Accordingly, when the information processing apparatus 20 and the brake controller 11 are mounted in the same brake ECU, the function of the information processing apparatus 20 for arbitrating the requests from a plurality of applications can be given to all types of vehicles.

As ECUs that are mounted in the vehicle regardless of the type of vehicle, there is an ECU that controls the powertrain or an ECU that controls the steering: however, in a case where communication between the ECUs is interrupted, the ECU that controls the steering cannot generate braking force alone. While the ECU that controls the powertrain can generate braking force with transmission or regeneration, since a friction brake cannot be used, there is a restriction to braking force that can be generated. Accordingly, from a viewpoint of securing safety at the time of the occurrence of failure, it is more desirable to provide the information processing apparatus 20 in the brake ECU among the existing ECUs.

In a case where failure, such as communication interruption between the ECUs, occurs during autonomous driving or the like, control that should be executed in order to secure safety is different according to the speed of the vehicle. For example, in a case where the vehicle speed at the time of the occurrence of failure is equal to or lower than 3 km/h, it is desirable to instantly apply the brake to stop the vehicle. In contrast, in a case where the vehicle speed at the time of the occurrence of failure is 50 km/h, it is dangerous to apply the brake suddenly, and there is a need to gradually reduce the vehicle speed and to then stop the vehicle. In order to detect the vehicle speed with high reliability, the wheel speed sensor is indispensable, and a measurement value of the wheel speed sensor is input to the brake ECU through a direct line for control of the brake. Accordingly, from a viewpoint of executing control for making transition to a safe state according to the vehicle speed at the time of the occurrence of failure or the like, it is desirable to provide the information processing apparatus 20 in the brake ECU. The measurement value of the wheel speed sensor of each of four wheels is input directly to the brake ECU through a signal line. Accordingly, even in a case where any wheel speed sensor fails, it is possible to estimate the vehicle speed based on the measurement values of the remaining wheel speed sensors, and to execute brake control according to the vehicle speed.

Data Set of Request Information

FIG. 3 is a diagram showing a format of a data set of request information that is output from the execution unit to the request arbitration unit. Hereinafter, details of the data set of the request information will be described referring to FIGS. 1 and 3 together.

The format shown in FIG. 3 represents the data set of the request information that is output from the applications to be executed in the execution units 1a to 1c to the receiver 21 of the request arbitration unit 5 in order to drive the actuators 13a to 13d. The data set of the request information includes a plurality of data items (longitudinal interface (IF) package) representing the movement of the vehicle in the front-rear direction, a plurality of data items (lateral interface (IF) package) representing the movement of the vehicle in the lateral direction, and a plurality of data items relating to other movement of the vehicle.

In the embodiment, the data items representing the movement of the vehicle in the front-rear direction include a plurality of data items (longitudinal IF package (lower limit side)) representing a lower limit value and a plurality of data items (longitudinal IF package (upper limit side)) representing an upper limit value. The data items representing the upper limit value and the data items representing the lower limit value are provided in the data set output from the execution units 1a to 1c, whereby it is possible to set the movement control of the vehicle in the front-rear direction within a range. The data set shown in FIG. 3 is transmitted from the execution units 1a to 1c to the request arbitration unit 5 of the information processing apparatus 20 through the in-vehicle network, such as a CAN. Hereinafter, each data item will be described.

1-1. Longitudinal IF Package (Lower Limit Side)

A request longitudinal ID (lower limit) is a data item that designates an identifier of an application. In the request longitudinal ID (lower limit), an identifier of an application that sets a value to a requested acceleration (lower limit) described below is set.

The requested acceleration (lower limit) is a data item that designates a lower limit value of an acceleration to be requested by the application. The requested acceleration (lower limit) means a minimum acceleration that is to be generated in the vehicle by the application.

A brake permission flag (lower limit) is a data item that designates whether or not to permit the use of the brake in order to achieve the requested acceleration (lower limit). In the brake permission flag (lower limit), any one of a value representing "permitted" and a value representing "unpermitted" can be set.

A gear shift priority request (lower limit) is a data item that designates how gear shift control (shift change) should be executed in order to achieve the requested acceleration (lower limit). In the gear shift priority request (lower limit), any one of a value representing "passive" a value representing "permitted", and a value representing "unpermitted" can be set. The gear shift control of "passive" refers to control for performing a gear shift following a drive power gear shift line prepared in advance in order to achieve the requested acceleration (lower limit). The gear shift control of "permitted" refers to control for positively performing a gear shift (downshift) in order to achieve the requested acceleration (lower limit). The gear shift control of "unpermitted" refers to control for prohibiting a gear shift (downshift) and fixing a gear stage to a specific gear stage in order to achieve the requested acceleration (lower limit).

A responsiveness request (lower limit) is a data item that designates strength (responsiveness) of feedback control for achieving the requested acceleration (lower limit).

An accelerator override prohibition flag is a data item that designates whether or not to invalidate an accelerator pedal operation by the driver. The application can set any one of a value representing "invalid" and a value representing "valid" in the accelerator override prohibition flag.

1-2. Longitudinal IF Package (Upper Limit Side)

A request longitudinal ID (upper limit) is a data item that designates an identifier of an application. In the request longitudinal ID (upper limit), an identifier of an application that sets a value to a requested acceleration (upper limit) described below is set.

The requested acceleration (upper limit) is a data item that designates an upper limit value of the acceleration to be requested by the application. The requested acceleration (upper limit) means a maximum acceleration that the application permits the vehicle.

A brake permission flag (upper limit) is a data item that designates whether or not to permit the use of the brake in order to achieve the requested acceleration (upper limit). In the brake permission flag (upper limit), any one of a value representing "permitted" and a value representing "unpermitted" can be set.

A gear shift priority request (upper limit) is a data item that designates how gear shift control (shift change) should be executed in order to achieve the requested acceleration (upper limit). In the gear shift priority request (upper limit), any one of a value representing "passive", a value representing "permitted", and a value representing "unpermitted" can be set. The gear shift control of "passive" refers to control for performing a gear shift following a drive power gear shift line prepared in advance in order to achieve the requested acceleration (upper limit). The gear shift control of "permitted" refers to control for positively performing a gear shift (downshift) in order to achieve the requested acceleration (upper limit). The gear shift control of "unpermitted" refers to control for prohibiting a gear shift (downshift) and fixing a gear stage to a specific gear stage in order to achieve the requested acceleration (upper limit).

The responsiveness request (upper limit) is a data item that designates strength (responsiveness) of feedback control for achieving the requested acceleration (upper limit).

1-3. Lateral IF Package

A request lateral ID is a data item that designates an identifier of an application. In the request lateral ID, an identifier of an application that sets a value to a requested steering angle/yaw rate/rotation radius described below is set.

A requested steering angle/yaw rate/rotation radius is a data item that designates a control amount of the movement in the lateral direction to be requested by the application. In the requested steering angle/yaw rate/rotation radius, any one of the requested steering angle, the requested yaw rate, and the requested rotation radius can be set. The requested steering angle is a turning angle of a tire needed to achieve the lateral movement of the vehicle calculated by the application. The requested yaw rate is a change rate of a yaw angle needed to achieve the lateral movement of the vehicle calculated by the application. The requested rotation radius is a rotation radius of the vehicle needed to achieve the lateral movement of the vehicle calculated by the application. In the application, although determination regarding whether or not any one of the requested steering angle, the requested yaw rate, and the requested rotation radius is used as the lateral control amount of the vehicle can be appropriately made according to the specification of the vehicle, the lateral control amount for use in the entire vehicle is unified such that the arbitration processing in the request arbitration unit can be easily executed.

A steering angle/yaw rate/rotation radius switching flag is a data item that designates the type of information set in the data item of the requested steering angle/yaw rate/rotation radius described above. With the use of the steering angle/yaw rate/rotation radius switching flag, the type of information set in the data item of the requested steering angle/yaw rate/rotation radius can be designated, whereby it is possible to flexibly change the type of information to be used according to the use of the vehicle or the like without increasing the number of data items.

A driver steering flag is a data item that designates whether or not the driver is steering. The application can set any one of a value representing "the driver is steering" and a value representing "the driver is not steering" in the driver steering flag. The application may acquire information regarding whether or not the driver is steering based on an output value of a sensor provided in the steering or an image of the driver captured by a camera.

A responsiveness request is a data item that designates strength (responsiveness) of feedback control for achieving the requested steering angle/yaw rate/rotation radius.

1-4. Other Data Items

A requested shift range is a data item that designates a shift range to be requested by the application. In the requested shift range, any one of values designating "drive (D)", "neutral (N)", "reverse (R)", "parking (P)", "manual (M)", "sport drive (S)", and the like can be set.

A shift override prohibition flag is a data item that designates whether or not to invalidate a shift operation of the driver. In the shift override prohibition flag, any one of a value designating "invalid" and a value designating "valid" can be set.

Data Set of Result Information

FIG. 4 is a diagram showing a formal of a data set of result information that is output from the request arbitration unit 5 to the execution units 1a to 1c. Hereinafter, details of the data set of the result information will be described referring to FIGS. 1 and 4 together.

The format shown in FIG. 4 represents the data set of the result information that is output from the arbitration result output unit 24 of the request arbitration unit 5 to the execution units 1a to 1c. The data set of the result information includes a plurality of data items representing a result after arbitration, a plurality of data items representing a current movement control state of the vehicle, a plurality of data items representing movement control of the vehicle currently implementable, and a plurality of data items representing operation states of an accelerator pedal and a brake pedal by the driver. The data set shown in FIG. 4 is transmitted from the request arbitration unit 5 of the information processing apparatus 20 to the execution units 1a to 1c through the in-vehicle network, such as a CAN. Hereinafter, each data item will be described.

2-1. Data Item Representing Result After Arbitration

An arbitration result_lateral ID is a data item that sets an identifier of an application requesting the lateral control amount (any one of the requested steering angle, the requested yaw rate, and the requested rotation radius) selected by the request arbitration unit 5. The application can determine whether or not the lateral control amount requested by the application is employed based on comparison of an identification ID set in the arbitration result_lateral ID with an identification ID of the application.

A selected requested steering angle/yaw rate/rotation radius is a data item that sets the lateral control amount (any one of the requested steering angle, the requested yaw rate, and the requested rotation radius) selected by the request arbitration unit 5.

A steering angle/yaw rate/rotation radius switching flag is a data item that designates the type of information set in the data item of the selected requested steering angle yaw rate/rotation radius.

An arbitration result_longitudinal ID is a data item that sets an identifier of a request source of an acceleration employed in the powertrain controller 10. To the powertrain controller 10, instruction information including a longitudinal requested acceleration selected through arbitration in the request arbitration unit 5 and a driver requested acceleration based on an accelerator pedal operation are input. The powertrain controller 10 selects any acceleration based on comparison of the requested acceleration included in the received instruction information with the driver requested acceleration, and drives the actuators 13a, 13b based on the selected acceleration. In the powertrain controller 10, in a case where the requested acceleration from the application is selected, an identifier of the application as an output source of the requested acceleration is set in the arbitration result_longitudinal ID. In the powertrain controller 10, in a case where the driver requested acceleration is selected, a value that allows a driver request to be discriminated is set in the arbitration result_longitudinal ID. Each application can determine whether or not the longitudinal requested acceleration output from the application is employed based on comparison of the identification ID set in the arbitration result_longitudinal ID with the identification ID of the application.

A selected acceleration is a data item that sets the acceleration employed in the powertrain controller 10.

The arbitration result_longitudinal ID and the selected acceleration can be set based on information notified from the powertrain controller 10 to the request arbitration unit 5 (the information acquisition unit 23 of FIG. 2).

2-2. Data Item Representing Current Movement Control State of Vehicle

An estimated vehicle body acceleration is a data item that sets an acceleration of a vehicle body to be estimated from an output value of a sensor mounted in the vehicle. The estimated vehicle body acceleration can be calculated based on an output of an acceleration sensor or a wheel speed sensor.

An estimated vehicle body acceleration invalidation flag is a data item that sets a flag representing whether or not the estimated vehicle body acceleration is an invalid value. In a case where an output value of an acceleration sensor mounted in the vehicle is invalid due to failure or the like, or in a case where one or more output values of the wheel speed sensors mounted in the wheels is invalid due to failure or the like, a value representing the estimated vehicle body acceleration is "invalid" is set in the estimated vehicle body acceleration invalidation flag. In a case where all of the output values of the acceleration sensor mounted in the vehicle and the wheel speed sensor mounted in the wheels are valid, a value representing that the estimated vehicle body acceleration is "valid" is set in the estimated vehicle body acceleration invalidation flag.

A current shift range is a data item that sets a currently selected shift range. In the current shift range, any one of values designating "drive (D)", "neutral (N)", "reverse (R)", "parking (P)", "manual (M)", "sport drive (S)", and the like can be set. A value to be set to the current shift range can be acquired from an actuator that is subjected to shift control by the powertrain controller 10.

A brake control execution flag is a data item that sets a flag representing whether or not brake control is in execution. In the brake control execution flag, any one of a value representing that the brake control is "in execution" and a value representing that the brake control is "not executed" can be set. The brake control execution flag can be set based on information representing an operation state of the brake to be acquired from the brake controller (brake control ECU).

A stop holding state is a data item that sets an operation state or an abnormal state of control (brake hold control) for maintaining a braking state by the brake until a predetermined condition is satisfied after the vehicle is stopped by the brake. In the stop holding state, any one of a value representing that the brake hold control is "in operation", a value representing that the brake hold control is "not operated", and a value representing an "abnormal stale" occurring in the brake hold control can be set. The stop holding state can be set based on information representing the operation state of the brake to be acquired from the brake controller 11.

2-3. Data Item Representing Movement Control of Vehicle Currently Implementable

A vehicle speed limit flag is a data item that sets information representing whether or not a vehicle speed currently implementable by the vehicle is limited. In a case where any one of the actuators 13a to 13d fails, information relating to a failure state is output from the failed actuator or a controller (ECU) controlling the actuator. In the vehicle speed limit flag, any one of information representing that the limit of the vehicle speed is "requested" and information representing that the limit of the vehicle speed is "not requested" is set based on information relating to the failure state of the actuator.

A vehicle speed limit is a data item that sets an upper limit value of the vehicle speed in a case where the limit of the vehicle speed is requested. In the vehicle speed limit, a value calculated based on information relating to the failure state output from the failed actuator or the controller (ECU) controlling the actuator is set. The vehicle speed limit may be calculated based on information relating to the failure state in the request arbitration unit 5 or may be determined in advance corresponding to a failure state to be assumed.

A braking system assistance level is a data item that sets information representing usability of a function related to brake control or limit function. Information to be set in the braking system assistance level may be generated based on information relating to the failure state output from the actuator 13c constituting the brake device or the brake controller 11 controlling the actuator 13c in the request arbitration unit 5.

A drive system assistance level is a data item that sets information representing usability of a function related to powertrain control or limit function. Information to be set in the drive system assistance level may be generated based on information (information representing a temporary abnormal state, such as high temperature, failure, or the like) representing the stales of the actuators 13a, 13b output from the actuators 13a, 13b constituting the powertrain or the powertrain controller 10 controlling the actuators 13a, 13b in the request arbitration unit 5.

A lateral control system assistance level is a data item that sets information representing usability of a function related to the movement control of the vehicle in the lateral direction or limit function. The movement of the vehicle in the lateral direction can be controlled by individually adjusting the braking force generated in the wheels, in addition to being controlled using the steering device. Accordingly, in the lateral control system assistance level, composite information relating to the steering device and the brake device is set. Information to be set in the lateral control system assistance level may be generated based on information relating to a failure state output from the actuator 13d constituting the steering device, the steering controller 12, the actuator 13c constituting the brake device, and the brake controller 11 in the request arbitration unit 5.

A full-closed estimated ground acceleration is a data item that sets an estimated value of an acceleration to be output from the powertrain when the accelerator is fully closed. The full-closed estimated ground acceleration can be set based on information to be notified from the powertrain controller 10 to the request arbitration unit 5.

A lull-open estimated ground acceleration is a data item that sets an estimated value of an acceleration to be output from the powertrain when the accelerator is fully open. The full-open estimated ground acceleration can be set based on information to be notified from the powertrain controller 10 to the request arbitration unit 5.

2-4. Data Item Representing Operation States of Accelerator Pedal and Brake Pedal by Driver An accelerator pedal-related driver requested acceleration is a data item that sets a requested acceleration to be calculated based on a depression amount of the accelerator pedal by the driver. The accelerator pedal-related driver requested acceleration can be set based on information to be notified from the powertrain controller 10 to the request arbitration unit 5.

A brake pedal-related driver requested acceleration is a data item that sets a requested acceleration to be calculated based on a depression amount of the brake pedal by the driver. The requested acceleration to be set in the brake pedal driver requested acceleration is a value that does not include an acceleration to be requested by an automatic brake function of a driving assistance application. The brake pedal driver requested acceleration can be set based on information to be notified from the brake controller 11 to the request arbitration unit 5.

Data Set of Instruction Information (for Powertrain Controller)

FIG. 5 is a diagram showing a format of a data set of instruction information that is output from the request generation unit 6 to the powertrain controller 10. Hereinafter, details of a data set of instruction information for a powertrain controller will be described referring to FIGS. 1 and 5 together.

The format shown in FIG. 5 represents the data set of the instruction information that is output from the request generation unit 6 of the information processing apparatus 20 to the powertrain controller 10. The data set for a powertrain controller is generated and transmitted to the powertrain controller 10 through the in-vehicle network, such as a CAN, by the request generation unit 6. Hereinafter, each data item will be described.

Target drive power (upper limit) is a data item that designates target drive power needed to achieve a requested acceleration (upper limit) of an application. In the target drive power (upper limit), a value obtained by converting the requested acceleration (upper limit) selected through the arbitration of the request arbitration unit 5 to drive power is set.

A target longitudinal ID (upper limit) is a data item that sets an identifier of an application, in the target longitudinal ID (upper limit), an identifier of an application that outputs the requested acceleration (upper limit) selected through the arbitration of the request arbitration unit 5 is set.

A target acceleration (upper limit) is a data item that designates the requested acceleration (upper limit) of the application. In the target acceleration (upper limit), the requested acceleration (upper limit) selected through the arbitration of the request arbitration unit 5 is set.

Target drive power (lower limit) is a data item that designates target drive power needed to achieve a requested acceleration (lower limit) of an application. In the target drive power (lower limit), a value obtained by converting the requested acceleration (lower limit) selected through the arbitration of the request arbitration unit 5 to drive power is set.

A target longitudinal ID (lower limit) is a data item that sets an identifier of an application. In the target longitudinal ID (lower limit), an identifier of an application that outputs the requested acceleration (lower limit) selected through the arbitration of the request arbitration unit 5 is set.

A target acceleration (lower limit) is a data item that designates the requested acceleration (lower limit) of the application. In the target acceleration (lower limit), the requested acceleration (lower limit) selected through the arbitration of the request arbitration unit 5 is set.

An accelerator override prohibition flag is a data item that designates whether or not to invalidate an accelerator pedal operation by the driver. In the accelerator override prohibition flag, an accelerator override prohibition flag included in the data set of the request information along with the requested acceleration (lower limit) selected through the arbitration of the request arbitration unit 5 is set. The accelerator override prohibition flag is used in order to reject the driver requested acceleration based on the accelerator pedal operation in the powertrain controller 10 in a case where the request from the application has priority higher than the accelerator pedal operation of the driver.

A gear shift priority flag (upper limit) is a data item that designates how the gear shift control (shift change) should be executed in older to achieve the target drive power (upper limit). In the gear shift priority flag (upper limit), a gear shift priority request (upper limit) included in the data set of the request information along with the requested acceleration (upper limit) selected through the arbitration of the request arbitration unit 5 is set. Accordingly, in the gear shift priority flag (upper limit), similarly to the gear shift priority request (upper limit), any one of a value representing "passive", a value representing "permitted", and a value representing "unpermitted" is set. The gear shift control of "passive" refers to control for performing a gear shift following a drive power gear shift line prepared in advance in order to achieve the target drive power (upper limit). The gear shift control of "permitted" refers to control for positively performing a gear shift (downshift) in order to achieve the target drive power (upper limit). The gear shift control of "unpermitted" refers to control for prohibiting a gear shift (downshift) and fixing a gear stage to a specific gear stage in order to achieve the target drive power (upper limit).

A gear shift priority flag (lower limit) is a data item that designates how the gear shift control (shift change) should be executed in order to achieve the target drive power (lower limit), in the gear shift priority flag (lower limit), the gear shift priority request (lower limit) included in the data set of the request information along with the requested acceleration (lower limit) selected through the arbitration of the request arbitration unit 5 is set. Accordingly, in the gear shift priority flag (lower limit), similarly to the gear shift priority request (lower limit), any one of a value representing "passive", a value representing "permitted", and a value representing "unpermitted" is set. The gear shift control of "passive" refers to control for performing a gear shift following a drive power gear shift line prepared in advance in order to achieve the target drive powder (lower limit). The gear shift control of "permitted" refers to control for positively performing a gear shift (downshift) in order to achieve the target drive power (lower limit). The gear shift control of "unpermitted" refers to control for prohibiting a gear shift (downshift) and fixing a gear stage to a specific gear stage in order to achieve the target drive power (lower limit).

A data item that notifies the powertrain controller 10 of information relating to reliability of communication may be further provided.

Data Set of Instruction Information (for Steering Controller)

FIG. 6 is a format of a data set of instruction information that is output from the request generation unit 8 to the steering controller 12. Hereinafter, details of a data set of instruction information for a steering controller will be described referring to FIGS. 1 and 6 together.

The format shown in FIG. 6 represents the data set of the instruction information that is output from the request generation unit 8 of the information processing apparatus 20 to the steering controller 12. The data set for a steering controller is generated and transmitted to the steering controller 12 through the in-vehicle network, such as a CAN, by the request generation unit 8. Hereinafter, each data item will be described.

A target lateral ID is a data item that sets an identifier of an application. In the target lateral ID, an identifier of an application that outputs the lateral control amount selected through the arbitration of the request arbitration unit 5 is set.

A target steering angle/yaw rate/rotation radius is a data item that designates a target value for achieving the lateral control amount to be requested from the application. In the target steering angle/yaw rate/rotation radius, any one of a target steering angle, a target yaw rate, and a target rotation radius is set. In the target steering angle/yaw rate/rotation radius, a value of the requested steering angle/yaw rate/rotation radius included in the data set of the request information selected through the arbitration of the request arbitration unit 5 is set.

A steering angle/yaw rate/rotation radius switching flag is a data item that specifies the type of information set in the data item of the target steering angle/yaw rate/rotation radius described above. In the steering angle/yaw rate/rotation radius switching flag, a value of the steering angle yaw rate/rotation radius switching flag included in the data set of the request information received by the request arbitration unit 5 is set.

A driver steering flag is a data item that designates whether or not the driver is steering. In the driver steering flag, a driver steering flag included in the data set of the request information along with the requested steering angle/ yaw rate/rotation radius selected through the arbitration of the request arbitration unit 5 is set.

A responsiveness request is a data item that designates strength (responsiveness) of feedback control for achieving the target steering angle/yaw rate/rotation radius described above. In the responsiveness request, a value of a responsiveness request included in the data set of the request information along with requested steering angle/yaw rate/rotation radius selected through the arbitration of the request arbitration unit 5 is set.

Data Set of Instruction Information (for Brake Controller)

FIG. 7 is a diagram showing a format of a data set of instruction information that is output from the request generation unit 7 to the brake controller 11. Hereinafter, details of a data set of instruction information for a brake controller will be described referring to FIGS. 1 and 7 together.

The format shown in FIG. 7 represents the data set of the instruction information that is output from the request generation unit 7 of the information processing apparatus 20 to the brake controller 11. The data set shown in FIG. 7 is generated by the request generation unit 7. In a case where the information processing apparatus 20 is provided in an ECU different from the brake controller 11, the data set shown in FIG. 7 is transmitted to the brake controller 11 through the in-vehicle network, such as a CAN, by the request generation unit 7. In a case where the information processing apparatus 20 and the brake controller 11 are provided in the same ECU, the data set shown FIG. 7 does not flow on the in-vehicle network, and is output from the request generation unit 7 to the brake controller 11 through a signal line in the ECU.

The braking force to be generated by the brake device is the same physical quantity as the drive power to be generated by the powertrain in different directions. Accordingly, the data set to be output from the request generation unit 8 to the brake controller 11 is basically a data set in which the drive power is replaced with the braking force in the data set to be output from the request generation unit 6 to the powertrain controller 10. Hereinafter, each data item will be described.

Target braking force (upper limit) is a data item that designates target braking force needed to achieve the requested acceleration (upper limit) of the application. In the target braking force (upper limit), a value obtained by converting the requested acceleration (upper limit) selected through the arbitration of the request arbitration unit 5 to braking force is set.

A target longitudinal ID (upper limit) is a data item that sets an identifier of an application. In the target longitudinal ID (upper limit), an identifier of an application that outputs the requested acceleration (upper limit) selected through the arbitration of the request arbitration unit 5 is set.

A target acceleration (upper limit) is a data item that designates the requested acceleration (upper limit) of the application. In the target acceleration (upper limit), the requested acceleration (upper limit) selected through the arbitration of the request arbitration unit 5 is set.

Target braking force (lower limit) is a data item that designates target braking force needed to achieve the requested acceleration (lower limit) of the application. In the target braking force (lower limit), a value obtained by converting the requested acceleration (lower limit) selected through the arbitration of the request arbitration unit 5 to braking force is set.

A target longitudinal ID (lower limit) is a data item that sets an identifier of an application. In the target longitudinal ID (lower limit), an identifier of an application that outputs the requested acceleration (lower limit) selected through the arbitration of the request arbitration unit 5 is set.

A target acceleration (lower limit) is a data item that designates the requested acceleration (lower limit) of the application. In the target acceleration (lower limit), the requested acceleration (lower limit) selected through the arbitration of the request arbitration unit 5 is set.

A gear shift priority flag (upper limit) is a data item that designates how the gear shift control (shift change) should be executed in order to achieve the target braking force (upper limit). In the gear shift priority flag (upper limit), a gear shift priority request (upper limit) included in the data set of the request information along with the requested acceleration (upper limit) selected through the arbitration of the request arbitration unit 5 is set. Accordingly, in the gear shift priority flag (upper limit), similarly to the gear shift priority request (upper limit), any one of a value representing "passive", a value representing "permitted", and a value representing "unpermitted" is set. The gear shift control of "passive" refers to control for performing a gear shift following a braking force gear shift line prepared in advance in order to achieve the target braking force (upper limit). The gear shift control of "permitted" refers to control for positively performing a gear shift (downshift) in order to achieve the target braking force (upper limit). The gear shift control of "unpermitted" refers to control for prohibiting a gear shift (downshift) and fixing a gear stage to a specific gear stage in order to achieve the target braking force (upper limit).

A gear shift priority flag (lower limit) is a data item that designates how the gear shift control (shift change) should be executed in order to achieve the target braking force (lower limit). In the gear shift priority flag (lower limit), a gear shift priority request (lower limit) included in the data set of the request information along with the requested acceleration (lower limit) selected through the arbitration of the request arbitration unit 5 is set. Accordingly, in the gear shift priority flag (lower limit), similarly to the gear shift priority request (lower limit), any one of a value representing "passive", a value representing "permitted", and a value representing "unpermitted" is set. The gear shift control of "passive" refers to control for performing a gear shift following a braking force gear shift line prepared in advance in order to achieve the target braking force (lower limit). The gear shift control of "permitted" refers to control for positively performing a gear shift (downshift) in order to achieve the target braking force (lower limit). The gear shift control of "unpermitted" refers to control for prohibiting a gear shift (downshift) and fixing a gear stage to a specific gear stage in order to achieve the target braking force (lower limit).

A data item that notifies the brake controller 11 of information relating to reliability of communication may be further provided.

Control Processing in Vehicle Control System

FIG. 8 is a sequence diagram illustrating control processing in the vehicle control system according to the embodiment. In the description of FIG. 8, the accelerator, the brake, and the steering are collectively referred to as "operating units", and the powertrain controller, the brake controller, and the steering controller are collectively referred to as "controllers". Hereinafter, control that is performed in the vehicle control system will be described referring to FIGS. 1, 2, and 8 together.

Step 1-1: When the operating units 2 to 4 are operated by the driver, the operating units 2 to 4 output the driver requested acceleration and the driver requested lateral control amount according to the operation amounts to the request generation units 6 to 8.

Step 1-2: When the operating units 2 to 4 are operated by the driver, the operating units 2 to 4 also output the driver requested acceleration and the driver requested lateral control amount output in Step 1-1 to the request arbitration unit 5.

Step 2-1: The applications that are executed in the execution units 1a to 1c generate request information for requesting the actuators for control needed to execute the driving assistance functions, and transmit the generated request information to the request arbitration unit 5 through the in-vehicle network. In more detail, the applications generate the data sets in which requested values are set in the needed data items of the format shown in FIG. 3, and send the generated data sets to the in-vehicle network in a state of being stored in a data frame for communication. The data items in which the applications should set the requested values are different according to the driving assistance functions to be provided by the applications. For example, in a case of the application that provides adaptive cruise control, the requested values are set in both of the longitudinal IF package (lower limit side) and the longitudinal IF package (upper limit side) shown in FIG. 3, whereby it is possible to prescribe a range of an acceleration (vehicle speed) of the vehicle. In a case of the application that provides lane keeping assistance, the requested values may be set in at least the lateral IF package shown in FIG. 3. Like autonomous driving or automatic parking, in a case of the application that provides a function of controlling both of the movement of the vehicle in the longitudinal direction and the movement of the vehicle in the lateral direction, the requested values are set in the longitudinal IF package (lower limit side), the longitudinal IF package (upper limit side), and the lateral IF package shown in FIG. 3. Other kinds of information shown in FIG. 3 are appropriately set according to functions or control to be provided by the applications. Since the data items to be used for the arbitration in the request arbitration unit 5 are the requested acceleration (lower limit), the requested acceleration (upper limit), and the requested lateral control amount (requested steering angle/yaw rate/rotation radius), when at least one of these data items is set, the arbitration processing can be executed.

Step 2-2: The request arbitration unit 5 arbitrates the requests received from the applications. In the request arbitration unit 5, first, the receiver 21 receives the data sets of the request information transmitted from the execution units 1a to 1c. Next, the arbitration unit 22 executes the arbitration processing based on the requested acceleration and the lateral control amount included in the received data set. The arbitration unit 22 performs arbitration in terms of the longitudinal IF package (lower limit side), the longitudinal IF package (upper limit side), and the lateral IF package shown in FIG. 3. Hereinafter, an example of an arbitration method will be described.

The arbitration of the longitudinal IF package (lower limit side) is performed based on comparison of the requested accelerations (lower limit) included in a plurality of received data sets. For example, the arbitration unit 22 may select a minimum value of the values of a plurality of requested accelerations (lower limit) as the requested acceleration (lower limit) after arbitration. The arbitration unit 22 selects the longitudinal IF package (lower limit side) included in the data set of the same request information as the selected requested acceleration (lower limit) as an arbitration result on a lower limit side of the movement in the longitudinal direction.

The arbitration of the longitudinal IF package (upper limit side) is also performed based on comparison of the requested accelerations (upper limit) included in the received data sets. For example, the arbitration unit 22 may select a minimum value of the values of a plurality of requested accelerations (upper limit) as the requested acceleration (upper limit) after arbitration. The arbitration unit 22 selects the longitudinal IF package (upper limit side) included in the data set of the same request information as the selected requested acceleration (upper limit) as an arbitration result on an upper limit side of the movement in the longitudinal direction.

The arbitration of the lateral IF package is performed based on comparison of the requested steering angles/yaw rates/rotation radii (lateral control amounts) included in the received data sets, hi a case where there is no request that is different from the lateral control amount to be arbitrated, for example, the arbitration unit 22 may select a largest lateral control amount of the requested lateral control amounts as the lateral control amount after arbitration. In a case where there is a request that is different from the lateral control amount to be arbitrated, a request that satisfies a specific condition may be selected with priority according to a rule determined in advance.

Step 2-3: The arbitration unit 22 of the request arbitration unit 5 outputs the longitudinal IF packages (lower limit side) and (upper limit side) selected as the arbitration result to the request generation units 6, 7, and outputs the lateral IF package selected as the arbitration result to the request generation unit 8.

Step 2-4: The request generation units 6 to 8 generate the data sets of the instruction information including the target control values for driving the actuators 13a to 13d based on the arbitration result of the arbitration unit 22.

The request generation unit 6 generates the data set (FIG. 5) of the instruction information for the powertrain controller using the longitudinal IF packages (lower limit side) and (upper limit side) (hereinafter, these are collectively referred to as "selected longitudinal IF packages") selected by the arbitration unit 22. Specifically, the request generation unit 6 converts the requested accelerations (upper limit) and (lower limit) included in the selected longitudinal IF packages to power, and sets the values after conversion in the target drive power (upper limit) and (lower limit) of the data set shown in FIG. 5. The request generation unit 6 sets the request longitudinal IDs (upper limit) and (lower limit), the requested accelerations (upper limit) and (lower limit), the accelerator override prohibition flag, the gear shift priority requests (upper limit) and (lower limit) included in the selected longitudinal IF packages in the target longitudinal IDs (upper limit) and (lower limit), the target accelerations (upper limit) and (lower limit), the accelerator override prohibition flag, and the gear shift priority flags (upper limit) and (lower limit) of the data set shown in FIG. 5, respectively. The request generation unit 6 sets a value in a communication invalidation flag as needed. In a case where any one of the longitudinal IF packages (lower limit side) and (upper limit side) is not selected by the arbitration unit 22, the request generation unit 6 generates a data set including solely instruction values corresponding to selected information.

The request generation unit 7 generates the data set (FIG. 7) of the instruction information for the brake controller 11 using the longitudinal IF packages selected by the arbitration unit 22. Specifically, the request generation unit 7 converts the requested accelerations (upper limit) and (lower limit) included in the selected longitudinal IF packages to power, and sets the values after conversion in the target braking force (upper limit) and (lower limit) of the data set shown in FIG. 5. The request generation unit 7 sets the request longitudinal IDs (upper limit) and (lower limit), the requested accelerations (upper limit) and (lower limit), and the gear shift priority requests (upper limit) and (lower limit) included in the selected longitudinal IF packages in the target longitudinal IDs (upper limit) and (lower limit), the target accelerations (upper limit) and (lower limit), the accelerator override prohibition flag, and the gear shift priority flags (upper limit) and (lower limit) of the data set shown in FIG. 7, respectively. The request generation unit 6 sets a value in the communication invalidation flag as needed.

The request generation unit X generates the data set (FIG. 6) of the instruction information for the steering controller 12 using the lateral IF package selected by the arbitration unit 22. Specifically, the request generation unit H sets the request lateral ID, the requested steering angle/yaw rate/rotation radius, the steering angle/yaw rate/rotation radius switching flag, the driver steering flag, and the responsiveness request include in the selected lateral IF package in the target lateral ID, the target steering angle/yaw rate/rotation radius, the steering angle yaw rate/rotation radius switching flag, the driver steering flag, and the responsiveness request of the data set shown in FIG. 6, respectively.

Step 2-5: The request generation units 6 to 8 output the generated data sets of the instruction information to the controllers 10 to 12, respectively. In a case where there are inputs from the operating units 2 to 4, the request generation units 6 to 8 output the driver requests input from the operating units 2 to 4 to the controllers 10 to 12 along with the instruction information.

Step 2-6: The controllers 10 to 12 control the actuators 13a to 13d based on the target values included in the instruction information and the driver requests received from the request generation units 6 to 8. The powertrain controller 10 can determine which of the target values of the driver requests included in the instruction information is employed in the powertrain controller 10 based on the magnitude of the upper limit value and the lower limit value of each data item included in the instruction information and the driver request, and the accelerator override prohibition flag. An example of control processing of drive power (acceleration) in the powertrain controller 10 will be described below.

Step 2-7: The controllers 10 to 12 output information relating to the operation states or employed control amounts of the actuators 13a to 13d to the request arbitration unit 5.

Step 2-8: The request arbitration unit 5 generates the data set (FIG. 4) of the result information. In the request arbitration unit 5, the arbitration result output unit 24 sets the request lateral ID, the requested steering angle/yaw rate/rotation radius, and the steering angle/yaw rate/rotation radius switching flag included in the lateral IF package selected by the arbitration unit 22 in the arbitration result_lateral ID, the selected steering angle/yaw rate/rotation radius, and the steering angle/yaw rate/rotation radius switching flag of the data set shown in FIG. 4, respectively. The arbitration result output unit 24 sets the arbitration result_longitudinal ID and the selected acceleration of the data set shown in FIG. 4 based on information relating to the acceleration employed in the powertrain controller 10 acquired from the powertrain controller 10 by the information acquisition unit 23. The arbitration result output unit 24 sets "information representing current movement control state of vehicle", "information representing movement control of vehicle currently implementable", and "information representing operation states of accelerator pedal and brake pedal by driver" of the data set shown in FIG. 4 based on various kinds of information acquired by the information acquisition unit 23.

Step 2-9: The arbitration result output unit 24 outputs the generated result information to the execution units 1a to 1c.

Steps 1-1 and 1-2 and Steps 2-1 to 2-9 described above are processing that is executed in parallel. Steps 2-1 to 2-9 described above are processing that is executed repeatedly at a given time interval.

Hereinafter, an example of drive power control of the vehicle that is executed by the powertrain controller 10 based on the instruction information generated by the request generation unit 6 and the driver requested acceleration will be described referring to FIG. 9. The drive power control of the vehicle shown in FIG. 9 corresponds to control that is executed by the powertrain controller 10 in Step 2-6 of FIG. 8.

FIG. 9 is a graph illustrating an example of the movement control of the vehicle in the longitudinal direction. In FIG. 9, the horizontal axis represents time, and the vertical axis represents drive power. A thick solid line shown in FIG. 9 represents implemented drive power to be output from the powertrain and represents the sum of drive power in a moving direction of the vehicle and braking force in a direction opposite to the moving direction.

In FIG. 9, long broken lines parallel to the horizontal axis represent an upper limit and a lower limit of target drive power set based on a requested acceleration from a driving assistance application of autonomous driving, cruise control, or the like. To the powertrain controller 10, the instruction information generated by the request generation unit 6 based on the arbitration result of the request arbitration unit 5 and the driver requested acceleration according to the accelerator pedal operation are input simultaneously. In the following description, it is assumed that, in the instruction information generated by the request generation unit 6, the target values are set in both of the data items of the target drive power (upper limit) and (lower limit). As a first stage, the powertrain controller 10 compares the driver requested drive power with the target drive power (lower limit) and selects greater drive power. As a second stage, the powertrain controller 10 compares the drive power selected in the first stage with the target drive power (upper limit) and selects smaller drive power. In the second stage, the selection of the smaller drive power between the drive power selected in the first stage and the target drive power (upper limit) is to more safely control the vehicle. The powertrain controller it) notifies the information acquisition unit 23 of the request arbitration unit 5 of information representing a request source of the employed drive power.

Specifically, at time t0 shown in FIG. 9, the driver requested drive power indicated by a short broken line is less than the lower limit of the target drive power set based on the request information from the application. In this case, the powertrain controller 10 rejects the driver requested drive power smaller than the lower limit of the target drive power of the application, and makes the actuators 13a, 13b output drive power corresponding to the lower limit value of the target drive power of the application.

At time t1 to t2 shown in FIG. 9, since the driver requested drive power is equal to or greater than the target drive power (lower limit) and is equal to or less than the target drive power (upper limit) set based on the request information from the application, the powertrain controller 10 makes the actuators 13a, 13b output drive power corresponding to the driver requested drive power.

At time t3 shown in FIG. 9, the driver requested drive power indicated by the short broken line exceeds the target drive power (upper limit) set based on the request information from the application. In this case, the powertrain controller 10 and/or the brake controller 11 controls a part or all of the actuators 13a to 13c to generate braking force having the same magnitude as surplus drive power beyond the target drive power (upper limit), thereby canceling the surplus drive power and suppressing the implemented drive power to the set upper limit of the target drive power.

In this way, in the powertrain controller 10 and the brake controller 11, it is possible to control the movement of the vehicle in the longitudinal direction based on the application request and the driver request arbitrated by the request arbitration unit 5.

Effects and the Like

As described above, the information processing apparatus 20 according to the embodiment receives the data set of the request information including the requested acceleration as information representing the movement of the vehicle in the front-rear direction and including any one of the steering angle, the yaw rate, and the rotation radius as information representing the movement of the vehicle in the lateral direction, arbitrates a plurality of requests of a plurality of applications based on the received request information, and performs a drive instruction of the actuators based on the arbitration result. The information processing apparatus 20 performs arbitration based on information (requested acceleration and/or lateral control amount) determined in advance, whereby it is possible to easily execute the arbitration processing without conversion or the like of the requested values even in a case where the types of applications implementing the driving assistance functions increases. Information received by the information processing apparatus 20 is determined in advance, whereby there is no need to change the arbitration processing in the information processing apparatus 20 or the control processing in the powertrain controller 10, the brake controller 11, and the steering controller 12 even in a case where the types of applications implementing the driving assistance functions increases. In a case where the requested acceleration is used as the data item to be used for the arbitration in the request arbitration unit 5, in the driving assistance application, there is no need to take into consideration peculiar information for each type of vehicle, such as the weight or air resistance of the vehicle, and mere movement to be requested to the vehicle may be taken into consideration. In a case where a request of the application is instructed with an acceleration, it is possible to comparatively easily perform the conversion of the physical quantity to power. Accordingly, the requested acceleration is employed as information representing the movement of the vehicle in the front-rear direction, having an advantage of easily performing development of a driving assistance application. The steering angle/yaw rate/rotation radius to be used as information representing the movement of the vehicle in the lateral direction can be used in common among the applications, the information processing apparatus 20, the powertrain controller 10, the brake controller 11, and the steering controller 12, and does not need to be converted to another control amount. Accordingly, the steering angle/yaw rate/rotation radius is employed as information representing the movement of the vehicle in the lateral direction, whereby it is possible to easily execute the arbitration processing.

In the data set of the request information received by the information processing apparatus 20 according to the embodiment, the data item (steering angle/yaw rate/rotation radius switching flag) that designates whether information representing the movement of the vehicle in the lateral direction is the steering angle, the yaw rate, or the rotation radius is provided. With the user of the data item, it is possible to switch and use one data item to represent any one of a plurality of information classifications, it is possible to reduce the amount of data compared to a case where the data item is allocated to each of the information classifications.

The data set of the request information received by the information processing apparatus 20 according to the embodiment includes the upper limit of the requested acceleration and the lower limit of the requested acceleration as the requested acceleration. In a case where the data set of the request information is constituted in this way, it is possible to prescribe the acceleration to be requested from the applications within a range.

The information processing apparatus 20 according to the embodiment includes the arbitration result output unit 24 that outputs the result information including the arbitration result to the applications as the request source. The arbitration result is fed back to the application, whereby it is possible to appropriately correct the control processing for implementing the driving assistance functions in the applications. In this case, it is desirable that the arbitration result output unit 24 feeds back result information including, in addition to the arbitration result, at least one of information representing the current state of the movement control of the vehicle and information representing the movement control of the vehicle currently implementable to the applications. In a case where at least one of information representing the current state of the movement control of the vehicle and information representing the movement control of the vehicle currently implementable is included in the result information, it is possible to correct the control processing for implementing the driving assistance functions based on the current state of the vehicle in the applications.

The information processing apparatus 20 according to the embodiment includes the request generation units 6, 7 that convert the requested acceleration arbitrated by the arbitration unit 22 of the request arbitration unit 5 to power as a unit of the output of the powertrain, and performs the drive requests to the actuators 13a to 13c with the instruction information including power after conversion. The needed conversion processing is executed by the request generation units 6, 7, whereby there is no need to change the format of the request information received by the receiver 21 of the request arbitration unit 5 or to perform the conversion processing of the physical quantity in the arbitration unit 22.

As described above, the embodiment has been described as an illustrative example in the present disclosure. For this purpose, the accompanying drawings and the detailed description have been provided. Accordingly, the components illustrated in the accompanying drawings and described in the detailed description may include not only components indispensable for the solution to the problem but also components not indispensable for the solution to the problem for illustration of the above-described technique. For this reason, merely based on the fact that the components not indispensable are illustrated in the accompanying drawings and described in the detailed description, the components that are not indispensable should not be immediately determined to be indispensable. Furthermore, since the above-described embodiment illustrates the technique in the present disclosure, various changes, replacements, additions, omission, or the like can be made within the scope of the claims or the equivalents thereof.

The disclosure can be used for a vehicle control device capable of controlling movement of a vehicle based on requests of a plurality of driving assistance applications.

What is claimed is:

1. An information processing apparatus mounted in a vehicle comprising:
   an ECU programmed to:
   receive a plurality of front-rear accelerations respectively from a plurality of drive assistance applications;
   arbitrate the plurality of front-rear accelerations;
   calculate a motion request based on the arbitration;
   distribute the motion request to at least one of a plurality of actuator systems;
   inform at least one of the drive assistance applications of:
   results of the arbitration; and
   information representing an operation of a driver of the vehicle.

2. The vehicle comprising the information processing apparatus of claim 1.

3. The information processing apparatus of claim 1, wherein a driver requested acceleration is not included in the plurality of front-rear accelerations.

4. The information processing apparatus of claim 1, wherein the ECU is programmed to:
   select one of the drive assistance applications that will employ the results of the arbitration; and
   inform at least one of the drive assistance applications that is not the selected drive assistance application of the selected drive assistance application along with the results of the arbitration.

5. The information processing apparatus of claim 1, wherein the information representing an operation of a driver of the vehicle is a driver-requested acceleration.

6. A manager mounted in a vehicle comprising:
   an ECU programmed to:
   receive a plurality of longitudinal accelerations respectively from a plurality of Advanced Driver Assistance Systems (ADAS) applications;
   arbitrate the plurality of received longitudinal accelerations;
   calculate a motion request based on the arbitration;
   distribute the calculated motion request to at least one of a plurality of actuator systems;
   inform at least one of the ADAS applications of:
   results of the arbitration; and
   driver's operation information.

7. The vehicle comprising the manager of claim 6.

8. The manager of claim 6, wherein a driver requested acceleration is not included in the plurality of front-rear accelerations.

9. The manager of claim 6, further comprising:
   selecting one of the ADAS applications that will employ the results of the arbitration; and
   informing at least one of the ADAS applications that is not the selected ADAS application of the selected ADAS application along with the results of the arbitration.

10. The manager of claim 6, wherein the driver's operation information is a driver-requested acceleration.

11. A system comprising:
    a plurality of actuator systems; and
    an information processing apparatus mounted in a vehicle, the information processing apparatus including an ECU programmed to:
    receive a plurality of front-rear accelerations respectively from a plurality of ADAS applications;
    arbitrate the plurality of front-rear accelerations;
    calculate a motion request based on the arbitration;
    distribute the motion request to at least one of the plurality of actuator systems;
    inform at least one of the ADAS applications of:
    results of the arbitration; and
    information representing an operation of a driver of the vehicle.

12. The vehicle comprising the system of claim 11.

13. The system of claim 11, wherein a driver requested acceleration is not included in the plurality of front-rear accelerations.

14. The system of claim 11, wherein the ECU is programmed to:
    select one of the ADAS applications that will employ the results of the arbitration; and
    inform at least one of the ADAS applications that is not the selected ADAS application of the selected ADAS application along with the results of the arbitration.

15. The system of claim 11, wherein the information representing an operation of a driver of the vehicle is a driver-requested acceleration.

16. A control method performed by an ECU mounted in a vehicle, the method comprising:
    receiving a plurality of front-rear accelerations respectively from a plurality of ADAS applications;
    arbitrating the plurality of front-rear accelerations;
    calculating a motion request based on the arbitration;
    distributing the motion request to at least one of a plurality of actuator systems; and
    informing at least one of the ADAS applications of:
    results of the arbitration; and
    information representing an operation of a driver of the vehicle.

17. The method of claim 16, wherein a driver requested acceleration is not included in the plurality of front-rear accelerations.

18. The method of claim 16, further comprising:
    selecting one of the ADAS applications that will employ the results of the arbitration; and
    informing at least one of the ADAS applications that is not the selected ADAS application of the selected ADAS application along with the results of the arbitration.

19. The method of claim 16, wherein the information representing an operation of a driver of the vehicle is a driver-requested acceleration.

* * * * *